Feb. 10, 1948.  A. W. MALL  2,435,892
CUTTING CHAIN
Filed Jan. 7, 1944
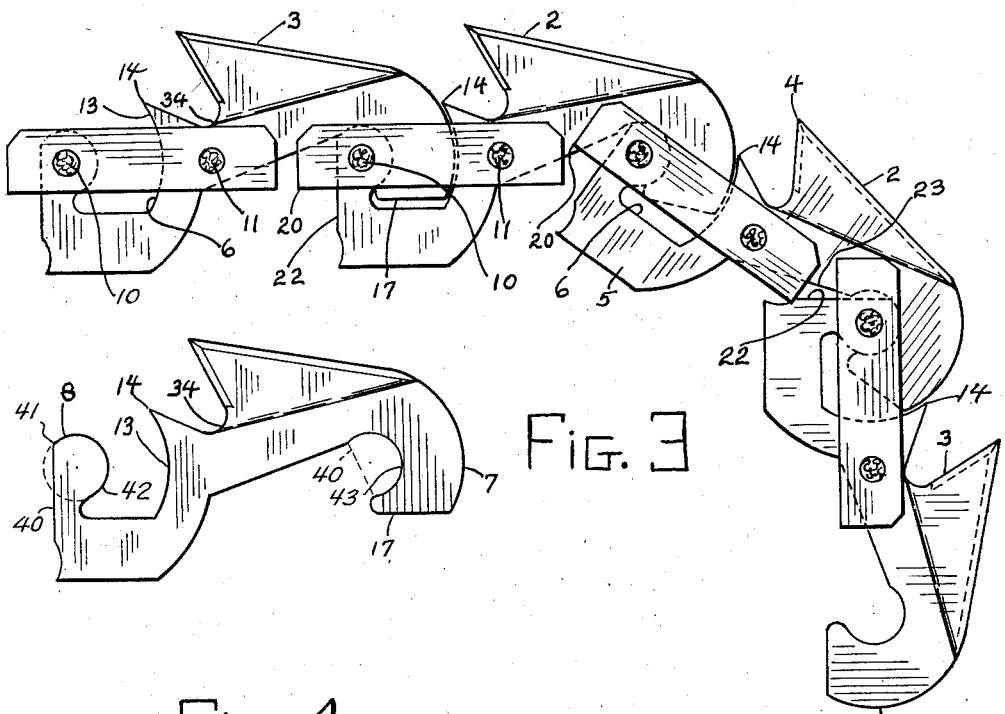
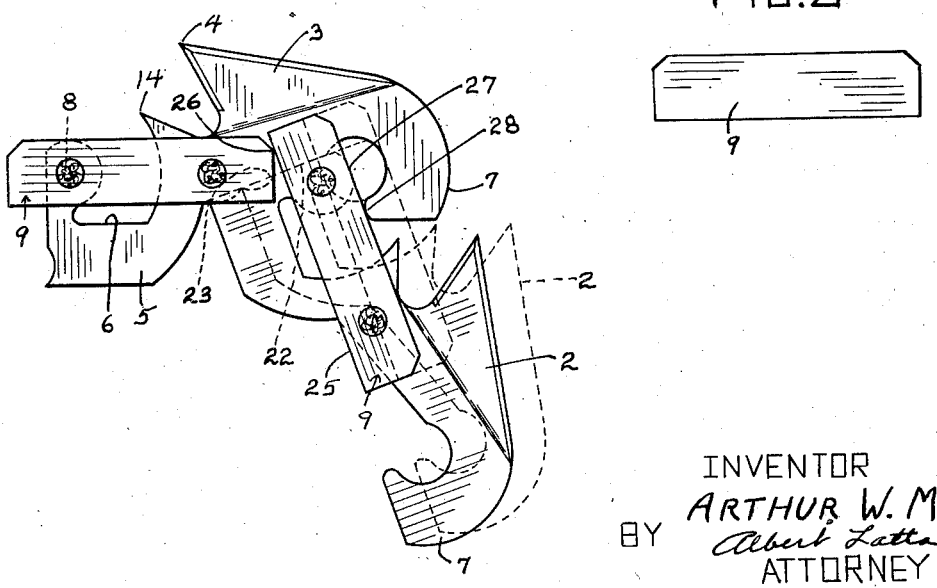
INVENTOR
ARTHUR W. MALL
BY Albert Latta
ATTORNEY Patented Feb. 10, 1948

2,435,892

UNITED STATES PATENT OFFICE 2,435,892

CUTTING CHAIN

Arthur W. Mall, Flossmoor, Ill., assignor to Mall Tool Company, Chicago, Ill., a corporation of Illinois Application January 7, 1944, Serial No. 517,442

9 Claims. (Cl. 143—135)

My invention relates to a new and improved cutting chain for wood cutting chain saw machines similar to the type shown in my copending application, Serial No. 510,409, filed November 15, 1943.

One object of my invention is to provide a cutting chain comprised of separate links which may be readily assembled and which tend to remain assembled when the chain breaks during operation.

Another object of my invention is to provide a link tooth with means for preventing sawdust from accumulating within the chain.

A third object of my invention is to provide a cutting chain with improved means for preventing the cutting teeth from kicking up about their pivots when engaging the wood being cut.

Other objects and advantages of my invention will become apparent upon examination of the following specification and drawing in which:

Fig. 1 is a fragmentary view showing a section of a cutting chain embodying my invention;

Fig. 2 is a detail view of one of the side pieces or connecting links;

Fig. 3 is a detail view of one of the cutting teeth; and

Fig. 4 is a diagrammatic view showing the action which takes place when the teeth tend to become disassembled.

My link-toothed cutting chain is comprised of a multitude of separable teeth, some of which may be cutting teeth 2 and some of which may be raker teeth 3 which function primarily to remove the chips severed by the cutting teeth.

Referring to Fig. 4, each of the teeth of my cutting chain are comprised of a cutting portion 4, a downwardly depending tongue portion 5 an arcuate slot 6 and an arcuate tail portion 7 rotatably received in the arcuate slot 6 of each succeeding tooth. The front wall of each slot 6 terminates in a cylindrically shaped pivot post 8 serving as a pivot for the preceding tooth. The side pieces 9 are welded face to face on opposite sides of each tooth by spot welds designated at 10 and 11 so as to be rigidly secured thereto. The side pieces 9 serve to provide side walls for slot 6 to prevent side play of the tail portions 7 which are received in slot 6. The rear wall 13 of each slot 6 continues upwardly beyond the upper edge of side piece 9 to form a pointed nose portion 14, the function of which will be hereinafter described.

It will be noted that the chain may be readily assembled and disassembled by inserting the tail portion 7 of each tooth into the slot 6 of each succeeding tooth and when the chain teeth are assembled into a continuous cutting chain it can be seen that the tail portion 7 can only be withdrawn from slot 6 by rotating the tail portion 7 about its pivot 8 until the underneath edge 17 of the tail portion reaches a position substantially as shown in Fig. 4. Thus while the cutting chain is traveling about a pair of spaced sprockets (not shown) the chain cannot become disassembled.

After the cutting chain has been operated on a chain sawing machine for a great length of time, occasionally one of the teeth will break and the chain is thrown off into space. When this occurs most of the teeth are likely to become disassembled and scattered about in various directions unless means are provided for preventing this. I have provided a construction in which the teeth tend to remain assembled when the cutting chain breaks during operation—at the most, only a very small percentage of the teeth would become disassembled upon breakage of the cutting chain. Thus the broken tooth could be readily replaced with a new tooth and the cutting chain could be quickly trained about the sprockets again. By referring to Figs. 1 and 4 it will be noted that the side pieces 9 are elongated and the space between each succeeding side piece 9 is about 1/8" (it is significant to note that each of Figs. 1, 2, 3, and 4 are twice actual size and consequently the actual distance is only about 1/16"). The space between each succeeding side piece 9 is controlled by the swinging of the side piece about pivot post 8 when the cutting chain travels about the sprockets, that is, for example, when one of the teeth 2 or 3 swings counterclockwise about the pivot 8 of each succeeding tooth, the side piece 9 likewise swings along with the tooth (being welded thereto). The lower corner 20 of the side piece 9 barely clears the end of the succeeding side piece 9 as it swings about the axis of the pivot 8. As previously pointed out the rear wall of each slot 6 is provided with an upwardly extending nose 14 which necessitates rotation of the tail portion 7 about pivot 8 to the maximum limit of the rotation (as shown in Fig. 4) before the tail portion 7 can be withdrawn from slot 6. The limit of rotation of tail portion 7 about the pivot 8 of the succeeding tooth is reached when the front wall 22 of depending tongue 5 engages the underneath surface 23 of the preceding tooth, as shown in Fig. 4. It will also be noted that (referring to Fig. 3) pivot post 8 is provided with a rectilinear front wall 40. By drawing an imaginary diametrical line from point 41 to point 42 (diametrically opposite from point 41), it will be noted that pivot post 8 is comprised of a circular portion which exceeds a half circle. Likewise referring to Fig. 3, it will be noted that the circular curvature 43 of tail portion 7 is in excess of a half circle, consequently, when pivot post 8 is assembled within curvature 43, as viewed in Fig. 1, disassembly of pivot post 8 from within the curvature 43 is only possible when it is rotated to the approximate position as shown in Fig. 4. The reason for this is as follows: If the circular portion of the pivot post 8 is made into an imaginary completed circle (as shown by dotted lines in Fig. 3) then front wall 40 forms a chord of said circle. Thus the distance from said chord to the opposite periphery of the circle is less than the diameter of the circle. Likewise the length of the imaginary chord 44 at the entrance of curvature 43 is less than the diameter of curvature 43, however, said chord length is greater than the distance across pivot post 8 heretofore mentioned, consequently, when pivot post 8 is rotated within curvature 43 to the approximate position shown in Fig. 4, then pivot post 8 can be withdrawn through the restricted entrance of curvature 43. I have shown diagrammatically in Fig. 4 how each tooth is assembled into the preceding tooth. Tooth 2 is inserted beneath tooth 3 and moved inwardly as the bottom edge 25 of side piece 9 rides on the corner 26 of the side piece 9 on tooth 3. During this inserting operation the uppermost part of pivot 8 (designated 27) just clears the nose 28 of tail portion 7. Tooth 2 is thus pushed inwardly until front wall 22 of tongue 5 engages the underneath surface 23 of tooth 3, then tooth 2 is moved upwardly at right angles to the inward movement (front wall 22 riding along surface 23) until tooth 2 is in the postion shown in dotted lines in Fig. 4. Then tooth 2 is rotated counter-clockwise until the tail portion 7 of the preceding tooth 3 is inserted within slot 6 of tooth 2.

It can thus be seen that each tooth when assembled to its preceding and succeeding tooth can be disassembled in only one position (as shown in Fig. 4) and then only after a right angular movement is accomplished. Thus when the cutting chain breaks during operation nearly all of the teeth remain assembled. It is significant to note that when tooth 2 begins to disassemble from tooth 3, the side piece 9 tends to cause the teeth to bounce back into their assembled positions. This action only tends to increase the tendency of the teeth to remain assembled when the cutting chain breaks.

The nose portion 14 at the upper end of each slot 6 serves the additional function of preventing sawdust from getting into the slot 6 by deflecting the sawdust into the cavity 34 where it is carried through the kerf until it is expelled at the exit end of the kerf.

Having thus described my invention, what I claim is:

1. A wood cutting chain comprising a plurality of separable teeth linked together to form a continuous flexible chain wherein adjacent teeth are adapted to assume a straight condition and flex to a bent condition, each of said teeth having a downwardly depending tongue portion and an arcuately shaped tail portion, an elongated substantially rectilinear bearing surface extending from the inner wall of said tail portion, each tongue portion continuing upwardly to form a pivot post, the tail portion of each tooth being rotatably mounted on the pivot post of each succeeding tooth, the front wall of each tongue portion being substantially rectilinear and adapted to engage the substantially rectilinear bearing surface of each preceding tooth whereby to limit the rotative movement of one tooth relative to its preceding tooth when the two teeth are moving from the straight condition to the bent condition, the substantially rectilinear bearing surface being greater in length than the length of the substantially rectilinear front wall of each tongue portion.

2. A wood cutting chain as described in claim 1 wherein means are also provided for limiting rotative movement of one tooth relative to its preceding tooth when the two teeth are moving from the bent condition to the straight condition.

3. A tooth for a cutting chain comprising a forward portion, said forward portion comprising a downwardly depending tongue portion, an arcuate wall at the rear of said tongue portion, an arcuate slot opening into the upper side of the tongue, one wall of said slot continuing circularly to form a pivot post, the circular portion of said pivot post being in excess of a semi-circle, the front wall of said pivot post interrupting the circular portion of said pivot post in the manner of a chordal line, the distance from the front wall of said pivot post to the rear wall of said pivot post, as measured by an imaginary line drawn normally from said front wall through the axis of the pivot post to the said rear wall, being less than the diameter of the circular portion of said pivot post, an arcuate tail portion adapted for mating with the arcuate slot in the forward portion, the front wall of said tail portion having a circular curvature in excess of a semi-circle whereby the distance across the mouth of said curvature is less than the diameter of said curvature, said last distance, however, being greater than the first mentioned distance across the pivot post.

4. A tooth for a cutting chain as described in claim 3 wherein the rear wall of the arcuate slot in the tongue portion continues circularly upwardly to a point and then recedes angularly rearwardly and downwardly to form an acute angularly shaped nose.

5. A tooth for a cutting chain as described in claim 3 wherein the rear wall of the arcuate slot in the tongue continues upwardly to a point and then recedes angularly rearwardly and downwardly to form an acute angularly shaped nose, a cutting portion having a front wall continuing downwardly and merging with the base of the nose.

6. A tooth for a cutting chain comprising a forward portion, said forward portion including a downwardly depending tongue portion, a slot in the upper region of said tongue portion, one wall of said slot continuing substantially circularly to form a pivot post, the circular portion of said pivot post being in excess of a semi-circle, the front wall of said pivot post interrupting the circular portion of said pivot post in the manner of a chordal line, the distance from the front wall of said pivot post to the rear wall of said pivot post, as measured by an imaginary line drawn vertically from said front wall through the axis of the pivot post to the said rear wall, being less than the diameter of the circular portion of said pivot post, an arcuate tail portion adapted for mating with the arcuate slot in the forward portion, the front wall of said tail portion having a circular curvature in excess of a semi-circle whereby the distance across the mouth of said curvature is less than the diameter of said curvature, said last distance, however, being greater than the first mentioned distance across the pivot post.

7. A tooth for a cutting chain comprising a forward portion including a downwardly depending tongue portion, an arcuate slot opening into the upper side of the tongue, one wall of said slot continuing circularly to form a pivot post, the other wall of said slot continuing upwardly beyond the plane defined by the uppermost part of the pivot post and then receding angularly downwardly whereby to form a pointed nose portion, and an arcuate tail portion adapted for mating with the arcuate slot in the forward portion of a similar tooth, the front wall of said tail portion having a circular curvature in excess of a semicircle leaving an opening with a neck portion narrower than the diameter of the curvature, the pivot post having one transverse dimension greater than the width of the neck and a second transverse dimension less than the width of the neck, both of such dimensions lying in the plane of the link and at an angle with respect to each other.

8. A tooth for a wood-cutting chain as described in claim 7 wherein a pair of elongated side pieces are rigidly secured to opposite sides of the tooth and extend across the walls of the arcuate slot whereby to form side retaining walls for said slot.

9. A tooth for a cutting chain comprising a forward portion including a downwardly projecting tongue portion, an arcuate slot opening into the upward side of the tongue, one wall of said slot continuing circularly to form a pivot post, an arcuate tail portion adapted for mating with the arcuate slot in the forward portion of a similar tooth, the front wall of said tail portion having a circular curvature in excess of a semicircle leaving an opening with a neck portion narrower than the diameter of curvature, the pivot post having one transverse dimension greater than the width of the neck and a second transverse dimension less than the width of the neck, both of such dimensions lying in the plane of the link and at an angle with respect to each other, an upwardly projecting portion disposed between the forward portion and the tail portion and disposed rearwardly of the arcuate slot, and a forward cutting edge on the upwardly projecting portion.

ARTHUR W. MALL.

REFERENCES CITED

The following references are of record in the file of this patent:

UNITED STATES PATENTS

| Number | Name | Date |
|---|---|---|
| 1,229,597 | Farrer | June 12, 1917 |
| 106,305 | Aydelott | Aug. 16, 1870 |
| 820,452 | Waller | May 15, 1906 |
| 873,666 | Gray et al. | Dec. 10, 1907 |
| 1,178,362 | Wall | Apr. 4, 1916 |
| 1,412,315 | Peters | Apr. 11, 1922 |